United States Patent [19]

Asagi et al.

[11] Patent Number: 4,591,038
[45] Date of Patent: May 27, 1986

[54] AUTOMATIC CLUTCH CONTROL SYSTEM

[75] Inventors: Yasuyoshi Asagi, Kawasaki; Noriaki Ogawa, Tokyo; Hitoshi Kasai, Kawasaki; Toshihiro Hattori, Ayase; Masaki Ishihara, Fujisawa; Makoto Uriuhara, Yokohama, all of Japan

[73] Assignee: Fujitsu Limited, Kawasaki, Japan

[21] Appl. No.: 620,090

[22] Filed: Jun. 13, 1984

[30] Foreign Application Priority Data

Jun. 16, 1983 [JP] Japan .................... 58-108248
Jun. 16, 1983 [JP] Japan .................... 58-108247

[51] Int. Cl.$^4$ .................................... B60K 41/28
[52] U.S. Cl. ...................... 192/0.073; 74/866; 192/0.076; 192/0.092; 192/103 R
[58] Field of Search ........... 192/0.073, 0.076, 0.092, 192/103 R; 74/866

[56] References Cited

U.S. PATENT DOCUMENTS 4,294,341 10/1981 Swart ................ 192/0.092 X
4,324,322 4/1982 Sibeud ............... 192/0.092 X
4,497,397 2/1985 Windsor et al. ....... 192/0.092 X Primary Examiner—Allan D. Hermann
Attorney, Agent, or Firm—Staas & Halsey

[57] ABSTRACT

An automatic clutch control system, for use in automobiles, using a microcomputer. Included in the system are an accelerator pedal sensor for detecting accelerator position; an engine speed sensor for detecting engine speed; a clutch stroke sensor for detecting clutch stroke; and an automobile speed sensor for detecting automobile speed. The microcomputer is included in a controller for controlling opening or closing of solenoid valves, gear change of a transmission, and opening or closing of a throttle actuator, based on predetermined stored data and based on signals transmitted from the sensors. The automatic clutch control system consequently can automatically control the clutch moving time and clutch moving speed for easy driving under all driving conditions. Moreover, while the clutch control system is fully automatic, it can use dry-type single-plate clutches and sliding-mesh-type transmissions as in manual and semiautomatic transmissions.

13 Claims, 17 Drawing Figures

AUTOMATIC CLUTCH CONTROL SYSTEM

BACKGROUND OF THE INVENTION

1. Field of the Invention

The present invention relates to a clutch control system, more particularly to a method and apparatus for an automatic clutch control system using a microcomputer.

The present invention is advantageously used, for example, in automobiles having conventional dry-type single-plate clutches and sliding-mesh-type transmissions.

An automatic clutch control system according to the present invention can automatically control clutch moving time, clutch moving speed, and gear changes under a predetermined control program stored in a microcomputer, thus allowing easy driving under all driving conditions.

2. Description of the Prior Art

As is well known, three main types of transmissions are now in use for clutch control and gear change in automobiles: manual transmissions, using dry-type single-plate clutches and sliding-mesh-type transmissions, which are manually operated by a clutch pedal and a change lever; semiautomatic transmissions, also using dry-type single-plate clutches and sliding-mesh-type transmissions, which have a gear change mechanism manually operated by a change lever and a clutch automatically controlled by a computer; and automatic transmissions, for example, using torque converters and planetary-gear-type auxiliary transmissions, which are automatically controlled by a computer controller.

As is also well known, each of these types of transmissions have their own advantages and disadvantages. The main disadvantages of manual transmissions are troublesome operability, poor smoothness of change, and susceptibility of efficiency to driving characteristics of individual drivers. The main disadvantage of semiautomatic transmissions is poor smoothness of change. Finally, the main disadvantages of automatic transmissions are poor gas mileage, slow response time, and high cost.

Although technical improvements have been made alleviating the above disadvantages, these improvements are still not sufficient.

SUMMARY OF THE INVENTION

The primary object of the present invention is to provide an automatic clutch control system, for use in automobiles, using a microcomputer and eliminating the disadvantages in the prior art.

Another object of the present invention is to provide an automatic clutch control system enabling highly precise, automatic control of clutch moving time and clutch moving speed under various driving conditions.

Still another object of the present invention is to provide an automatic clutch control system enabling use of conventional dry-type single-plate clutches and sliding-mesh-type transmissions.

In accordance with the present invention, there is provided an apparatus for an automatic clutch control system, for use in automobiles, using a microcomputer, and comprising sensing means and control means. The sensing means include accelerator sensing means for sensing accelerator position; engine-speed sensing means for sensing engine speed; clutch stroke sensing means for sensing clutch stroke; and automobile speed sensing means for sensing automobile speed. Control is provided by the control means, preferably the microcomputer for controlling opening or closing of solenoid valves, gear change of a transmission, and opening or closing of a throttle actuator, based on predetermined stored data and based on signals transmitted from the accelerator, engine speed, clutch stroke and automobile speed sensing means. The control means provides automatic control of clutch moving time and clutch moving speed and easy driving under all driving conditions.

Moreover, there is provided a method for automatic clutch control, for automobiles, using a microcomputer, comprising the steps of detecting, comparing and controlling. The detecting includes detecting accelerator position by an accelerator pedal sensor, engine speed by an engine speed sensor, clutch stroke by a clutch stroke sensor, and automobile speed by an automobile speed sensor. The comparing includes comparing the sensor data with predetermined stored data and calculating clutch moving time and clutch moving speed based on predetermined data for various driving conditions. The controlling includes controlling opening or closing of solenoid valves based on signals generated from flip-flop circuits via counters activated by the calculations and controlling the clutch moving time and clutch moving speed using a clutch actuator controlled by the solenoid valves.

The present invention enables easy driving under all driving conditions and improved operability and gas mileage compared with conventional manual, semiautomatic, and fully automatic transmissions. Moreover, it can be used with dry-type single-plate clutches and sliding-mesh-type transmissions used in conventional manual and semiautomatic transmissions.

DESCRIPTION OF THE PREFERRED EMBODIMENTS

In general, the rotation of an automobile engine is transmitted to the shaft of a transmission mechanism by a dry-type single-plate clutch. To control the clutch engagement, a hydraulic control actuator is used. The hydraulic control actuator includes a hydraulic cylinder used to engage and disengage the clutch and a plurality of solenoid valves used to control motion of the hydraulic cylinder. Control of the hydraulic actuator, i.e., control of the solenoid valves, is effected mechanically in manual transmissions and electronically in semiautomatic transmissions.

Before describing the preferred embodiments of the present invention, an explanation will be given of a conventional clutch control system for a semiautomatic transmission using a dry-type single-plate clutch and a hydraulic control actuator.

Figure 1:
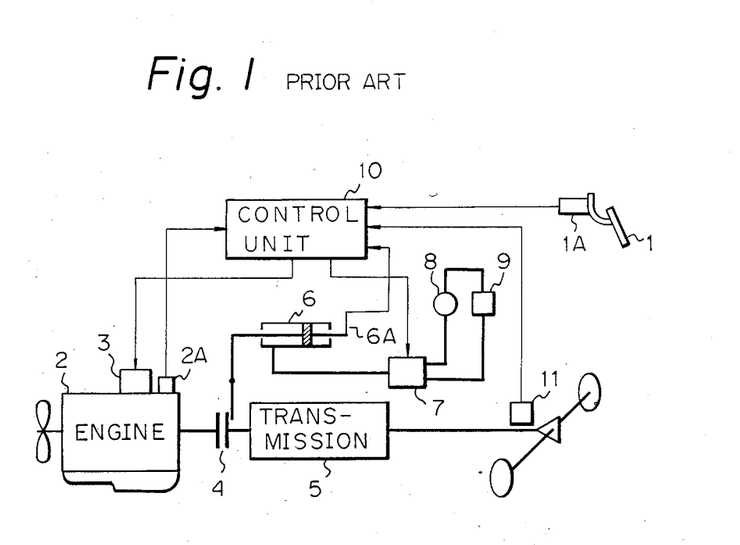
FIG. 1 is a block diagram of an automatic clutch control system in a conventional semiautomatic transmission.

Referring to FIG. 1, reference numeral 1 is an accelerator pedal, 1A an accelerator pedal sensor, 2 an engine, 2A an engine speed sensor, 3 a throttle actuator, 4 a clutch, 5 a transmission, 6 a clutch actuator, 6A a clutch stroke sensor, 7 a solenoid valve group, 8 an oil pump, 9 an oil tank, 10 a control unit, and 11 an automobile speed sensor.

The control unit 10, comprising a microcomputer, controls the throttle actuator 3 and the solenoid valve group 7 based on a signal transmitted from the accelerator pedal sensor 1A, a signal transmitted from the engine speed sensor 2A, a signal transmitted from the clutch stroke sensor 6A, and a signal transmitted from the automobile speed sensor 11. The control unit 10 also feeds back the stroke signal transmitted from the clutch stroke sensor 6A to control the opening of the solenoid valve group 7 for engagement, slip, or disengagement of the clutch based on the clutch moving speed, as defined by clutch engagement, clutch slip, clutch disengagement, change in engine speed, automobile speed, and other driving conditions.

In other clutch control systems used in semiautomatic transmissions, the system feeds back a stroke signal transmitted from a clutch stroke sensor, engine speed sensor, and automobile speed sensor to control the duty ratio (ratio of opening and closing time of valve) of a solenoid valves by a control unit to obtain both a clutch moving speed and clutch moving time defined by engine speed, automobile speed, and other driving conditions.

However, it is difficult to obtain the desired clutch moving speed and clutch moving time by controlling the opening or closing of the solenoid valves because it is necessary to finely control the duty ratio of the opening or closing of the valves, which necessitates complex valve control.

Figure 2:
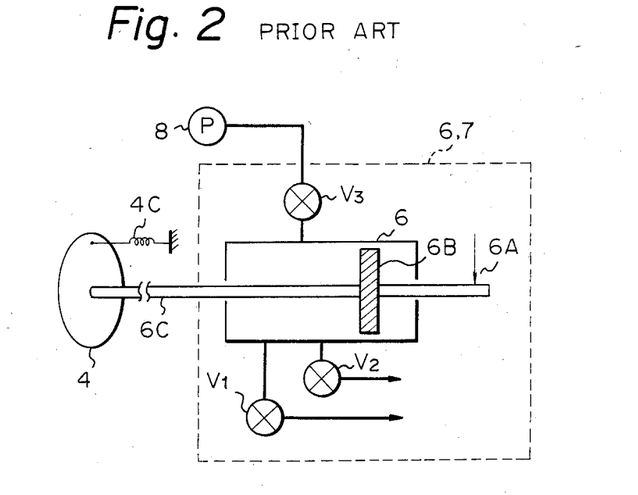
FIG. 2 is a partial schematic view of a clutch actuator shown in FIG. 1.

The above problems will be explained in detail hereinafter with respect to FIG. 2 and FIGS. 3(A), 3(B) and 3(C). Referring to FIG. 2, as mentioned above, the hydraulic control actuator comprises a clutch actuator, i.e., an oil cylinder 6, and a plurality of solenoid valves ($V_1$ to $V_3$). A piston 6B equipped with a piston rod 6C is provided in the oil cylinder 6. The solenoid valve $V_1$ is provided for exhaust in a small diameter fluid passage, and the solenoid valve $V_2$ is provided for exhaust in a large diameter fluid passage. The solenoid valve $V_3$ is provided for controlling the supply of oil via a fluid passage having a diameter which may be different from that of the exhaust passages.

Although only two exhaust solenoid valves $V_1$ and $V_2$ are shown in the drawing, generally a plurality of fluid passages having the same diameters are provided in the actuator and each fluid passage is controlled by a solenoid valve. In the case shown in the drawing, the solenoid valve $V_2$ is used for coarse control of the oil flow, and solenoid valve $V_1$ for fine control of the oil flow.

Figures 3A, 3B:
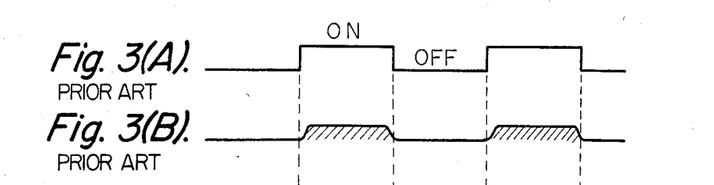
FIG. 3(A) is a timing chart of drive current applied to solenoid values $V_1$ and $V_2$.
FIG. 3(B) shows the quantity of oil flow through one solenoid valve $V_1$.
Figure 3C:
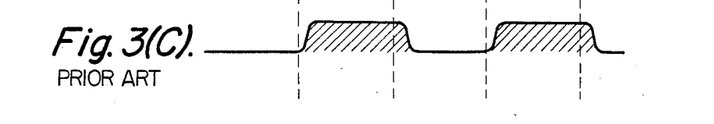
FIG. 3(C) shows the quantity of oil flow through another solenoid valve $V_2$.

Referring to FIGS. 3(A), 3(B), and 3(C) when a drive current having a pulse waveform as shown in FIG. 3(A) is applied to the solenoid valves $V_1$ and $V_2$, the oil flow through the solenoid valve $V_1$ in the small diameter fluid passage is shown by FIG. 3(B), and the oil flow through the solenoid valve $V_2$ in the large diameter fluid passage is shown by FIG. 3(C).

The oil flows through the solenoid valves $V_1$ and $V_2$ are constant so long as the pulse waveform of the drive current is the same, i.e., has the same pulse width. The oil flow, however, changes when the pulse width becomes smaller or due to increasingly smaller diameters of fluid passages, used to achieve finer control. As a result the control of the hydraulic actuator becomes unstable. Accordingly, it is difficult to obtain precise control of the opening or closing of the solenoid valves to obtain the desired clutch moving speed and clutch moving time.

An automatic clutch control system according to the present invention will now be explained in detail. As explained above, the automatic clutch control system according to the present invention can be used with conventional dry-type single-plate clutches and sliding-mesh-type transmission. In the present invention, the change lever used in semiautomatic transmissions is eliminated and a transmission changer (drive mechanism) is used instead. These clutch and drive mechanisms are controlled by a microcomputer controller. Accordingly, the clutch control system according to the present invention is a fully automatic transmission using a conventional manual clutch and transmission.

Figure 4:
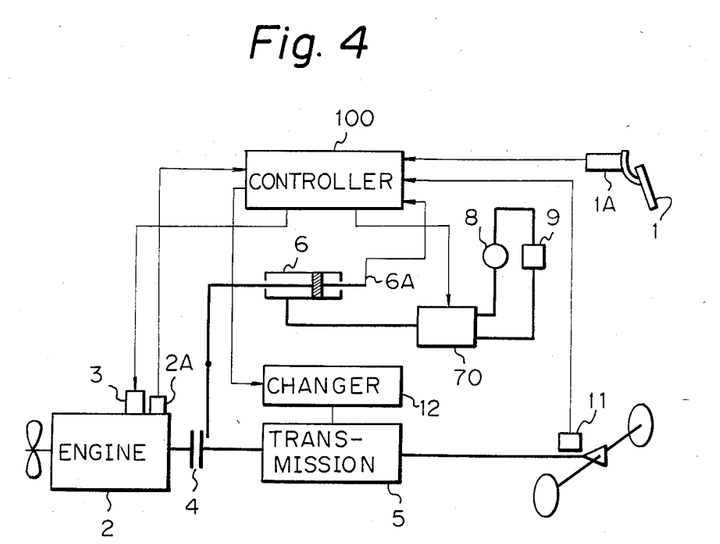
FIG. 4 is a block diagram of an automatic clutch control system according to the present invention.

Referring to FIG. 4, the automatic clutch control system depicted includes many of the same components shown in FIG. 1, and includes a controller 100, a solenoid valve group 70, and a changer 12 as new components. The components which are the same in FIG. 1 and FIG. 4, are indicated by the same reference numerals.

Figure 5:
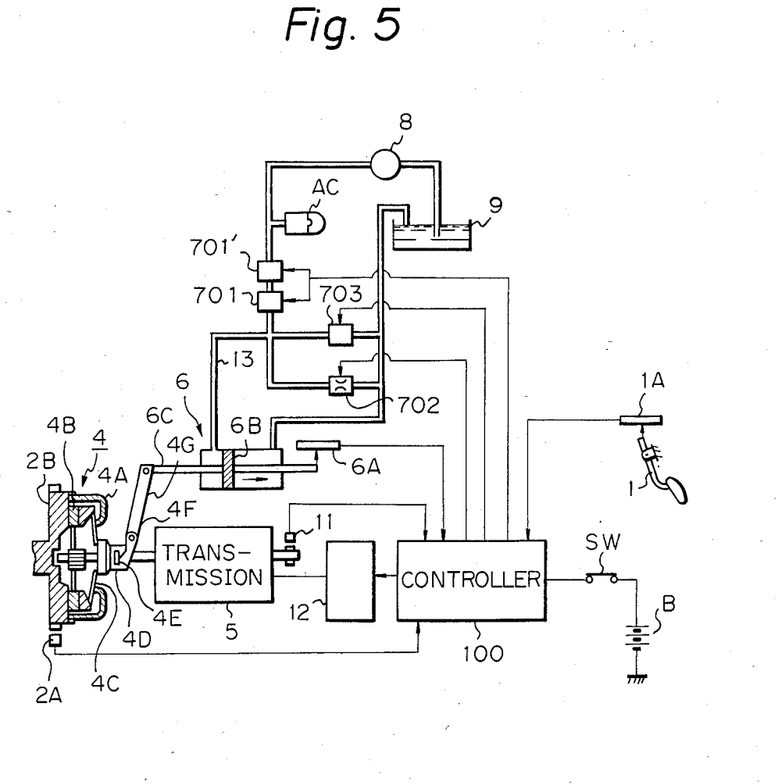
FIG. 5 is a block diagram of a hydraulic control circuit including the solenoid valves controlled by the controller shown in FIG. 4.

Referring to FIG. 5, the clutch 4 comprises a clutch pressure plate 4A, clutch disk 4B, diaphragm spring 4C, clutch release bearing 4D, clutch release lever 4E, clutch shaft 4F, and lever 4G. Reference numeral 2B is an engine flywheel; 701, 701', 702, and 703 are solenoid valves in the solenoid group 70; B is a battery; SW a power switch associated with an ignition switch; and AC an accumulator.

The clutch 4 is controlled by controlling the opening or closing of the solenoid valves 701, 701', 702, and 703 using the controller 100. The controller 100 comprises a microcomputer running a program which changes control with respect to driving conditions. When solenoid valves 701 and 701', for example, are actuated by the controller 100, pressurized fluid is supplied to the oil cylinder 6 from the oil pump 8. The piston 6B of the oil cylinder 6 is thus moved toward the right as indicated by the arrow line to disengage the clutch disk 4B. When the solenoid valves 702 and 703 are actuated by the controller 100, the pressurized fluid is exhausted from the oil cylinder 6. The piston 6B thus moves in the reverse direction due to the action of a return spring (not shown) to re-engage the clutch disk 4B.

This control of clutch engagement and disengagement will be explained in more detail hereinafter with respect to FIGS. 6, 7, 8, 9, and 10. The controller 100 stores various parameters, for example, a to d shown in FIGS. 7 to 9, defining the relationship between the clutch stroke and clutch moving time or between the clutch stroke and clutch moving speed based on various driving conditions, such as upward or downward slopes, flat roads, and stopping. The controller 100 uses these parameters a to d and the signal transmitted from the clutch stroke sensor 6A, for example, a potentiometer, to calculate desireable clutch moving speed and clutch moving time corresponding to the clutch stroke S and controls the solenoid valve group 70 based on the results of its calculations.

Figure 7:
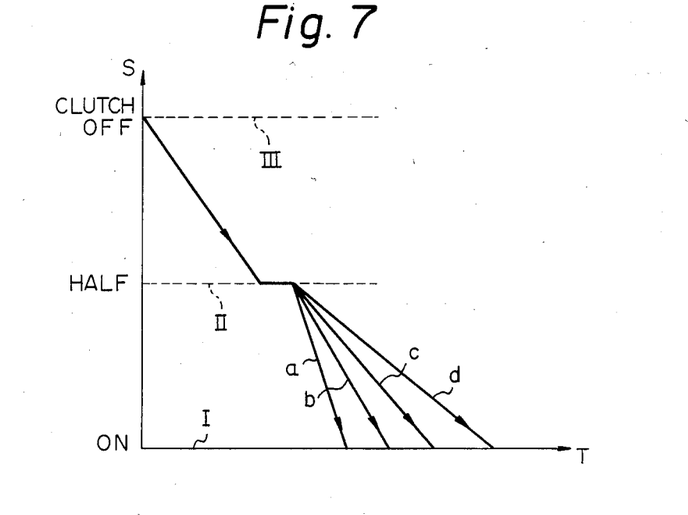
FIGS. 7-9 are graphs of relationships between clutch stroke and clutch moving time (FIG. 7) and between clutch stroke and clutch moving speed (FIG. 8 and FIG. 9)

The control modes will be explained in more detail with respect to FIGS. 7 to 9. Referring to FIG. 7, the ordinate indicates the clutch stroke (S) and the abscissa indicates the clutch moving time (T). The lines I, II, and III indicate clutch engagement (clutch on), clutch slip (half clutch), and clutch disengagement (clutch off). As is obvious from the graph, the clutch moving time is controlled by a predetermined gradually increasing value in the clutch operation from line III to line II and controlled by one of a set of predetermined gradually increasing values corresponding to a selected one of the driving condition parameters a to d in the clutch operation from line II to line I.

Figure 8:
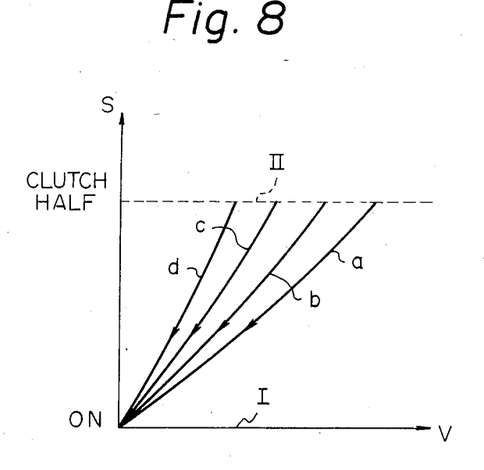
Figure 9:
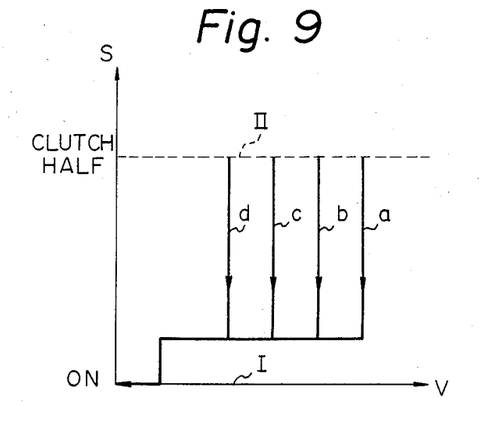

In FIGS. 8 and 9, the ordinates indicate the clutch stroke (S) and the abscissas indicate the clutch moving speed (V). In the control modes of both FIGS. 8 and 9, the clutch moving speed is controlled to maintain a constant value in the clutch operation from line III to line II. In FIG. 8, the clutch moving speed is controlled by one of a set of predetermined gradually decreasing values corresponding to a selected one of the driving condition parameters a to d in the clutch operation from line II to line I. In FIG. 9, the clutch moving speed is controlled by one of a set of predetermined constant values in the clutch operation from line II to near line I and by a predetermined constant value to line I.

Figure 6:
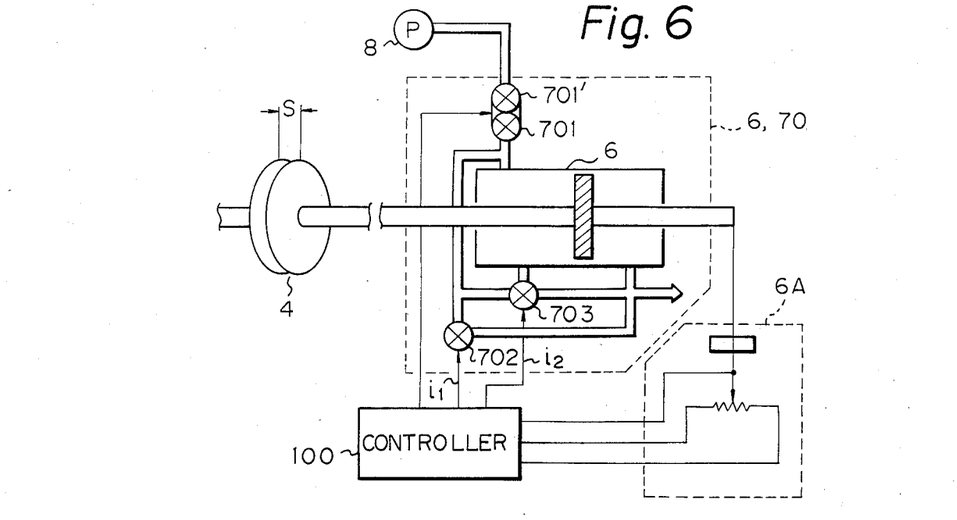
FIG. 6 is a block diagram for a portion of the automatic clutch control system shown in FIG. 4.

Next, fine control of the solenoid valves 701, 701', 702, and 703 shown in FIG. 5 and FIG. 6 will be explained in reference to FIGS. 10(A) to 10(D). According to the present invention, the open ("on") and closed ("off") timings of each solenoid valve 701, 701', 702, and 703 are controlled by the controller 100. The "on" and "off" timings can be independently selected by the controller 100. Generally, there is a time delay between the "on" and "off" timings in different valves. As a result, the quantity of oil flow through the valves changes gradually at the leading edges and trailing edges of the waveforms shown in FIG. 10.

Figure 10A:
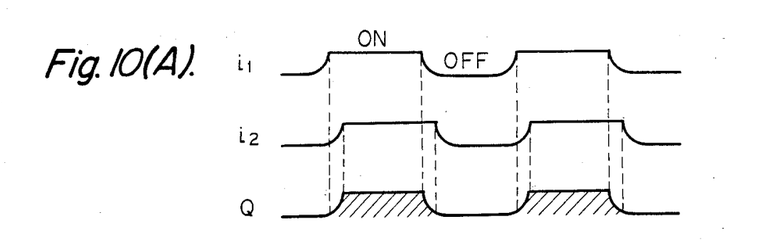
FIGS. 10(A)-(D) are timing charts for opening and closing of valves and the quantity of fluid flow therethrough.
Figure 10B:
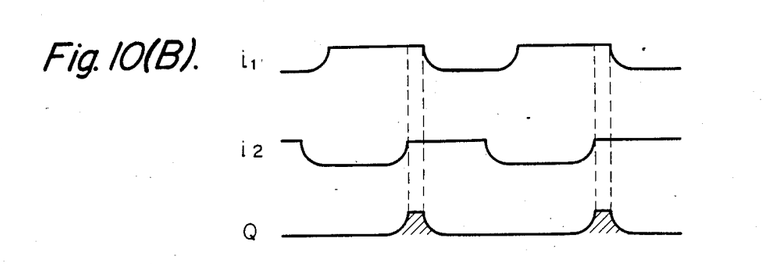
Figure 10C:
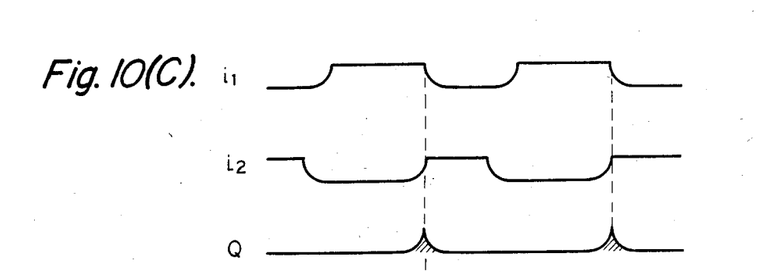

In the case of two valves connected in series, such as 701 and 701', when both valves are turned on nearly simultaneously by drive currents $i_1$ and $i_2$ and are left on for a long time, the quantity of oil flow Q is indicated by the hatched area in FIG. 10(A). When the valves are both on for an overlapping short time, the quantity of oil flow Q is as shown in FIG. 10(B). When the upstream valve is changed from "on" to "off" and the downstream valve is simultaneously changed from "off" to "on," the quantity of oil flow is as shown in FIG. 10(C). As is obvious from the waveform shown in FIG. 10(D), the amount of overlapping of the "on" and "off" timing of the valves affects the quantity of oil flow.

Figure 10D:
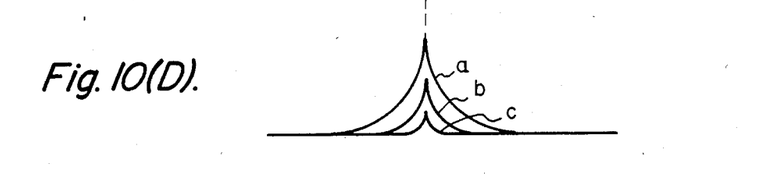

The method for controlling the quantity of oil flow according to the present invention is particularly advantageous when the solenoid valves 701, 701', 702, and 703 are controlled as shown in FIGS. 10(C) and 10(D). Now, in the embodiment shown, the solenoid valves 701 and 701' are provided in series in the supply side fluid passage, while the solenoid valves 702 and 703 are provided in parallel in the exhaust side fluid passage. In conventional systems using a single solenoid valve in the supply side, the solenoid valve has not been able to operate fast enough in accordance with a rapid succession of "on" and "off" instructions. As a result, conventionally, the quantity of oil flow through the valves during "on" and "off" timing has been unstable.

However, according to the present invention, "on" and "off" control of valves can be independently performed by the controller 100. Consequently, it is possible to control the solenoid valves 701, 701', 702, and 703 to operate with exactly the right timings. A stable flow of oil is possible even with an extremely small overlap of time in the "on" position. Consequently, since the quantity of oil flow through each valve can be finely controlled by the microcomputer, the clutch moving speed and the clutch moving time can be controlled for various driving conditions.

Figure 11:
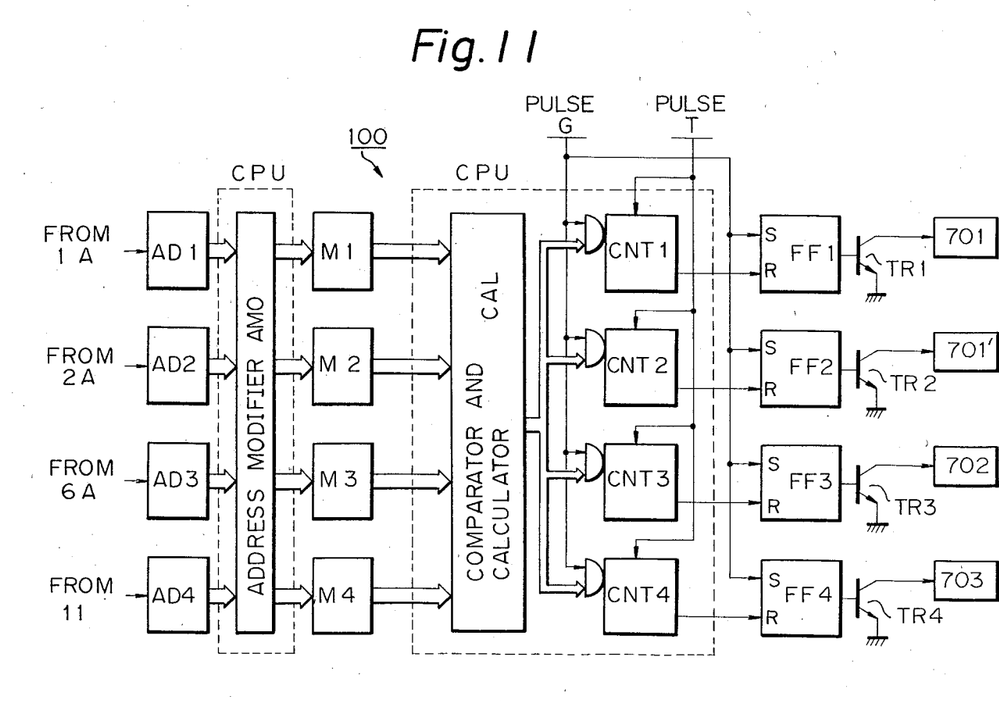
FIG. 11 is a basic block diagram of the controller 100 illustrated in FIG. 4.

Referring to FIG. 11, the controller 100 mainly comprises analog-digital converters AD1 to AD4, an address modifier AM0, memories M1 to M4, a comparator and calculator CAL, counters CNT1 to CNT4, and flip-flop circuits FF1 to FF4. The address modifier AM0, comparator and calculator CAL, and counters CNT are incorporated in a central processing unit CPU.

An analog output detected by, for example, the accelerator pedal sensor 1A is applied to the analog-digital converter AD1. An analog output detected by, for example, the clutch stroke sensor 6A is applied to the analog-digital converter AD2. The digital outputs from the analog-digital converters AD1 and AD2 are applied to the memories M1 and M2, respectively, via the address modifier AM0. The digital outputs designate addresses in the memories (tables) M1 and M2.

Data read from the tables is supplied to the comparator and calculator CAL and appropriately processed. In the case of memory M1, the resultant data and the pulse G are applied to the counter CNT1 for presetting the counter CNT1 and for setting the flip-flop FF1. When the flip-flop FF1 is set, the transistor TR1 turns on activating the solenoid valve 701. The counter CNT1 sequentially counts down from the preset number based on a periodically input pulse T and resets the flip-flop circuit FF1 upon reaching zero.

The output of the flip-flop circuit FF1 is applied to the base of a transistor TR1. When the transistor TR1 turns on as described above, the solenoid valve 701 is activated. When the flip-flop FF1 is reset upon the counter reaching zero, the transistor TR1 turns off and the solenoid valve 701 is deactivated. Accordingly, the larger the number preset in the counter CNT1, the longer the activated (on time) of the solenoid valve 701. The smaller the preset number, the longer the "on" time of the solenoid valve 701. If the gate value which controls output of the memory M1 is stored in another table, for example, memory M2, the clutch moving speed and clutch moving time can be controlled as shown in FIGS. 7 to 9.

Figure 12:
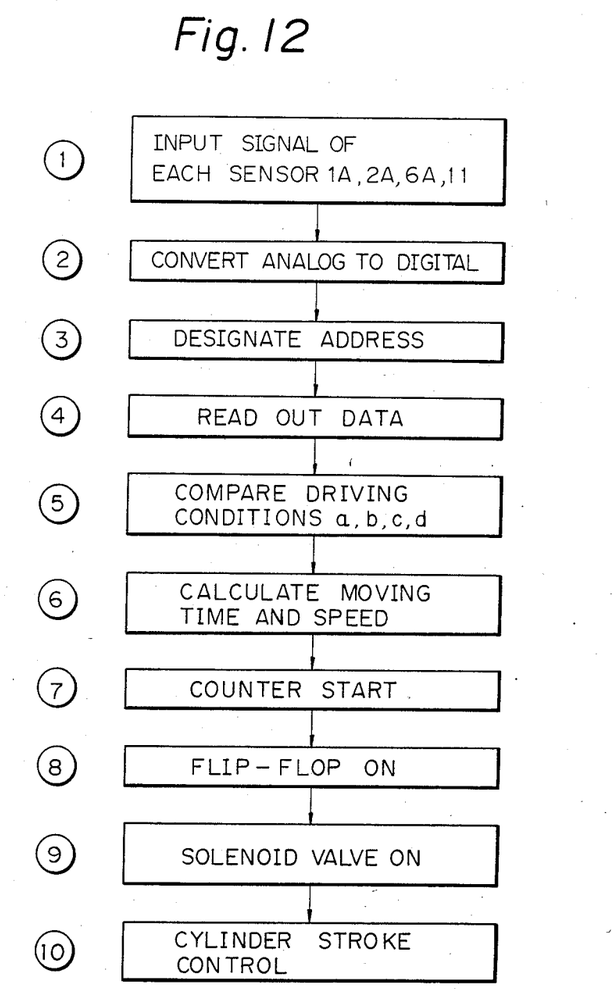
FIG. 12 is a flow chart of a clutch control procedure performed in the controller 100 illustrated in FIG. 11.

Referring to FIG. 12, the signals from each sensor, i.e., the accelerator pedal sensor 1A, the engine speed sensor 2A, the clutch stroke sensor 6A, and the automobile speed sensor 11, are first applied to the analog-digital converters at step 1. These analog signals are converted to digital signals at step 2. The digital signals transmitted from the analog-digital converters designate addresses in the tables at step 3. The stored data is read from the tables and applied to the comparator and calculator CAL at step 4. The comparator and calculator CAL compares the read data with pre-stored data of driving conditions a, b, c, and d and calculates differentials for obtaining clutch moving time and clutch moving speed based on commands transmitted from the central processing unit CPU at steps 5 and 6. The resultant data is applied to the counters, which sequentially count down from preset numbers based on the periodically input pulses at step 7. The flip-flop circuits are reset by other periodically input pulses when the counts become zero at step 8. The outputs of the flip-flop circuits are applied to the bases of the transistors and the transistors turn on. The solenoid valves are activated by the current flowing through the transistors at step 9. Consequently, the cylinder stroke is controlled by the "on" or "off" timing of each valve at step 10. Therefore, the clutch stroke can be suitably controlled for all driving conditions.

We claim:

1. An automatic clutch control apparatus, for use in automobiles which have an accelerator pedal, a clutch actuated via solenoid valves, a throttle actuator on an engine and a transmission having changeable gears, comprising:
   accelerator sensing means, coupled to the accelerator pedal, for sensing accelerator pedal position;
   engine speed sensing means, coupled to the engine, for sensing engine speed;
   clutch stroke sensing means, coupled to the clutch, for sensing clutch stroke;
   automobile speed sensing means, coupled to the transmission, for sensing automobile speed; and
   control means, operatively connected to said accelerator sensing means, said engine speed sensing means, said clutch stroke sensing means and said automobile speed sensing means, for controlling opening and closing of the solenoid valves, the gear change of the transmission and opening and closing of the throttle actuator, based on predetermined stored data and based on the position of the accelerator pedal, engine speed, clutch stroke and automobile speed, for automatic control of clutch moving time and clutch moving speed.

2. An apparatus as claimed in claim 1, wherein said clutch stroke sensing means comprises a potentiometer.

3. An apparatus as claimed in claim 1, wherein said control means comprises a microcomputer.

4. An automatic clutch control system for an automobile having an engine with a throttle, an accelerator pedal and a transmission with a clutch, said system comprising:
   a throttle actuator, coupled to the throttle, for adjustment of the throttle;
   a clutch actuator, coupled to the clutch, for controlling engagement and disengagement of the clutch;
   solenoid valves, hydraulically connected to said clutch actuator, for controlling the movement of said clutch actuator;
   clutch stroke sensing means, coupled to said clutch actuator, for sensing clutch stroke;
   accelerator sensing means, coupled to the accelerator pedal, for sensing accelerator position;
   engine speed sensing means, coupled to the engine, for sensing engine speed;
   automobile speed sensing means, coupled to the transmission, for sensing automobile speed; and
   control means, operatively connected to said clutch stroke sensing means, said accelerator sensing means, said engine speed sensing means and said automobile speed sensing means, for controlling opening and closing of the solenoid valves, gear change of the transmission and adjustments of the throttle actuator, in dependence upon the conditions sensed by said clutch stroke, accelerator, engine speed and automobile speed sensing means, to provide automatic control of clutch moving time and clutch moving speed.

5. An automatic clutch control system as claimed in claim 4, wherein said solenoid valves comprise a first group of at least two solenoid valves hydraulically connected to said clutch actuator in series and controlled by first overlapping timing signals from said control means.

6. An automatic clutch control system as claimed in claim 5,
   further comprising supply and exhaust fluid passages hydraulically connecting said clutch actuator and said solenoid valves,
   wherein said first group of at least two solenoid valves is connected to the supply fluid passage, and
   wherein said solenoid valves further comprise a second group of at least two solenoid valves connected to the exhaust fluid passage in parallel and controlled by second overlapping timing signals from said control means.

7. An automatic clutch control system as claimed in claim 6, wherein said supply fluid passage has a first diameter and said exhaust fluid passage has a second diameter different than the first diameter.

8. A method of automatic clutch control for automobiles, using a microcomputer and comprising the steps of:
   (a) detecting accelerator position by an accelerator pedal sensor, engine speed by an engine speed sensor, clutch stroke by a clutch stroke sensor, and automobile speed by an automobile speed sensor to generate sensor data;
   (b) comparing the sensor data with predetermined stored data and calculating a clutch moving time and a clutch moving speed, based on the predetermined stored data, for various driving conditions;
   (c) controlling at least one of opening and closing of solenoid valves based on signals generated from flip-flop circuits via counters activated by said calculating in step (b), two of the solenoid valves being series-connected solenoid valves and a quantity of fluid flow being controlled by overlapping timing of the least one of opening and closing of the series-connected solenoid valves using the microcomputer; and
   (d) controlling the clutch moving time and clutch moving speed by means of a clutch actuator controlled by the solenoid valves.

9. A method of a automatic clutch control, for automobiles, using a microcomputer, comprising the steps of:

(a) detecting accelerator position by an accelerator pedal sensor, engine speed by an engine speed sensor, clutch stroke by a clutch stroke sensor, and automobile speed by an automobile speed sensor to generate sensor data;
(b) comparing the sensor data with predetermined stored data and calculating a clutch moving time and a clutch moving speed, based on the predetermined stored data, for various driving conditions;
(c) controlling at least one of opening and closing of solenoid valves based on signals generated from flip-flop circuits via counters activated by said calculating in step (b); and
(d) controlling the clutch moving time and speed by means of a clutch actuator controlled by the solenoid valves, using a predetermined value from clutch disengagement to clutch slip and using one of a set of predetermined values corresponding to a selected one of parameters of driving conditions from clutch slip to clutch engagement.

10. A method of automatic clutch control for automobiles, using a microcomputer and comprising the steps of:
(a) detecting accelerator position by an accelerator pedal sensor, engine speed by an engine speed sensor, clutch stroke by a clutch stroke sensor, and automobile speed by an automobile speed sensor to generate sensor data;
(b) comparing the sensor data with predetermined stored data and calculating a clutch moving time and a clutch moving speed, based on the predetermined stored data, for various driving conditions;
controlling at least one of opening and closing of solenoid valves based on signals generated from flip-flop circuits via counters activated by said calculating in step (b); and
(d) controlling the clutch moving speed and time by means of a clutch actuator controlled by the solenoid valves, using a constant value from clutch disengagement to clutch slip and using one of a set of predetermined values corresponding to a selected one of parameters of driving conditions from clutch slip to clutch engagement.

11. A method of automatic clutch control for automobiles, using a microcomputer and comprising the steps of:
(a) detecting accelerator position by an accelerator pedal sensor, engine speed by an engine speed sensor, clutch stroke by a clutch stroke sensor, and automobile speed by an automobile speed sensor to generate sensor data;
(b) comparing the sensor data with predetermined stored data and calculating a clutch moving time and a clutch moving speed, based on the predetermined stored data, for various driving conditions;
(c) controlling at least one of opening and closing of solenoid valves based on signals generated from flip-flop circuits via counters activated by said calculating in step (b); and
(d) controlling the clutch moving speed and time by means of a clutch actuator controlled by the solenoid valves, using one of a set of predetermined constant values corresponding to a selected one of parameters of driving conditions from clutch slip to near clutch engagement and then using a predetermined constant speed to clutch engagement.

12. A method of automatic clutch control for automobiles, using a microcomputer and comprising the steps of:
(a) detecting accelerator position by an accelerator pedal sensor, engine speed by an engine speed sensor, clutch stroke by a clutch stroke sensor, and automobile speed by an automobile speed sensor to generate sensor data;
(b) comparing the sensor data with predetermined stored data and calculating a clutch moving time and a clutch moving speed, based on the predetermined stored data, for various driving conditions;
(c) controlling at least one of opening and closing of solenoid valves based on signals generated from flip-flop circuits via counters activated by said calculating in step (b), two of the solenoid valves being provided in series in a supply side fluid passage and another two of the solenoid valves being provided in parallel in an exhaust side fluid passage, a quantity of fluid flow being controlled by overlapping timing of the at least one of opening and closing of the solenoid valves of both the supply and exhaust sides using the microcomputer; and
(d) controlling the clutch moving time and clutch moving speed by means of a clutch actuator controlled by the solenoid valves.

13. A method as claimed in claim 12, wherein step (c) comprises controlling the solenoid valves in the exhaust side fluid passage which has a first diameter and in the supply side fluid passage which has a second diameter different from the first diameter.

* * * * *